US012699370B2

(12) United States Patent (10) Patent No.: US 12,699,370 B2

Shu et al. (45) Date of Patent: Aug. 4, 2026

(54) TESTING METHOD AND SYSTEM FOR ENHANCING THE GRID-SUPPORTING CAPABILITY OF ENERGY STORAGE INTEGRATED WITH RENEWABLE ENERGY

(71) Applicant: Kunming University of Science and Technology, Kunming (CN)

(72) Inventors: Hongchun Shu, Kunming (CN); Botao Shi, Kunming (CN); Guangxue Wang, Kunming (CN); Liuqing Zhu, Kunming (CN); Yutao Tang, Kunming (CN); Shunguang Lei, Kunming (CN); Yinan Hu, Kunming (CN)

( * ) Notice: Subject to any disclaimer, the term of this patent is extended or adjusted under 35 U.S.C. 154(b) by 0 days.

(21) Appl. No.: 19/023,423

(22) Filed: Jan. 16, 2025

(65) Prior Publication Data

US 2025/0362650 A1    Nov. 27, 2025

(30) Foreign Application Priority Data

May 21, 2024    (CN) .......................... 202410632498.7

(51) Int. Cl.
| | |
|---|---|
| H02J 103/30 | (2026.01) |
| G05B 13/04 | (2006.01) |
| H02J 3/00 | (2006.01) |

(52) U.S. Cl.
CPC .............. G05B 13/048 (2013.01); H02J 3/00 (2013.01); H02J 2103/30 (2026.01)

(58) Field of Classification Search
CPC ...... G05B 13/048; H02J 3/00; H02J 2103/30; G01R 31/00
See application file for complete search history.

(56) References Cited

U.S. PATENT DOCUMENTS

| | | | | |
|---|---|---|---|---|
| 2018/0294691 A1* | 10/2018 | Paiz | ....................... | H02K 7/025 |
| 2022/0343230 A1* | 10/2022 | Casey | ................... | G06Q 50/06 |

FOREIGN PATENT DOCUMENTS

| | | | | |
|---|---|---|---|---|
| CN | 115437354 A | * 12/2022 | ......... | G05B 23/0256 |
| CN | 116074351 A | 5/2023 | | |

* cited by examiner

*Primary Examiner* — Michael W Choi

(57) ABSTRACT

A method and a system to enhance the grid-supporting capability of energy storage integrated with renewable energy are provided. The method includes: determining and adjusting simulation parameters for various models based on a target testing project; simulating fault information and configuring the working state of physical terminals accordingly; identifying fault types and levels from operational parameters; determining fault handling strategies based on the faults; controlling physical terminals using the strategies and receiving feedback on handling results. This method ensures efficient and flexible testing for large-scale energy storage and renewable energy integration into the grid.

3 Claims, 3 Drawing Sheets

102

Enhancing grid support for new energy integration.

memory

101

Processor

103

TESTING METHOD AND SYSTEM FOR ENHANCING THE GRID-SUPPORTING CAPABILITY OF ENERGY STORAGE INTEGRATED WITH RENEWABLE ENERGY

CROSS-REFERENCE TO THE RELATED APPLICATIONS

This application is based upon and claims priority to Chinese Patent Application No. 202410632498.7, filed on May 21, 2024, the entire contents of which are incorporated herein by reference.

TECHNICAL FIELD

This invention relates to the field of testing electrical performance, specifically to a method and system for testing the ability of energy storage to enhance the support capacity of new energy integration into the power grid.

BACKGROUND

In power systems, both wind power generation and solar power generation have intermittent characteristics, which can increase the range of fluctuations in generation capacity. Additionally, as the power source and loads are located in different regions, large-scale injection into the grid poses a significant challenge to the safe operation of the power grid. By building a large-scale energy storage intelligent operation platform and utilizing the energy storage resources of grid companies, wind power and other power generation companies, as well as user-side resources from other industries for coordinated optimization, the utilization efficiency of energy storage resources is improved, thereby facilitating the consumption of clean energy.

The active support capability of the large-scale energy storage intelligent operation platform is commonly tested using physical dynamic simulation testing platforms or real-time digital simulation systems. A physical dynamic simulation testing platform is used to accurately simulate the dynamic characteristics of new energy and the charge-discharge characteristics of energy storage. However, due to the limited flexibility of the physical dynamic simulation testing platform, it cannot construct large-scale AC power systems, which makes it difficult to simulate the evolution of incidents following faults in the grid system.

The above content is provided solely to aid in understanding the technical solution of this invention and does not imply that the above content is acknowledged as prior art.

SUMMARY

The primary objective of this invention is to provide a testing method for enhancing the support capacity of energy storage in integrating new energy into the power grid. It aims to address the difficulties in simulating the evolution of incidents following faults in grid systems.

To achieve the above objective, the invention provides a method for testing the ability of energy storage to enhance the support capacity of new energy integration into the power grid. This testing method includes the following steps:

Based on the target test project, determine the simulation parameters corresponding to each simulation model. Then, perform parameter regulation operations on each simulation model based on these simulation parameters.

Use each simulation model to simulate the fault information corresponding to the target test project and configure the working state of the physical terminal according to the fault information.

Obtain the operating parameters of the physical terminal and determine the fault type and fault level of the physical terminal based on these operating parameters.

Determine the corresponding fault handling strategy according to the fault type and fault level.

Control the physical terminal using the work state information flow signal of the fault handling strategy and control the physical terminal using the control instructions of the fault handling strategy.

Receive the processing results fed back by the physical terminal.

Optionally, the step of performing parameter regulation operations on each simulation model based on each simulation parameter includes:

Performing parameter regulation operations on the power grid equipment model according to the line structure parameters, operating state parameters, and electrical component parameters within the simulation parameters.

Based on the operating state parameters in the simulation parameters, perform parameter regulation operations on the new energy model; based on the transformer ratio in the simulation parameters, perform parameter regulation operations on the transformer model.

Optionally, the steps of controlling the physical terminal based on the work state information flow signal of the fault handling strategy, and controlling the physical terminal based on the control instructions of the fault handling strategy, include:

Controlling the start-up, shutdown, and speed adjustment of the physical terminal based on the work state information flow signal of the fault handling strategy.

Controlling the restart and line switching of the physical terminal based on the control instructions of the fault handling strategy.

Optionally, after receiving the processing results fed back by the physical terminal, the method further includes:

Centrally storing the processing results.

Performing data analysis operations on the processing results to obtain corresponding analysis results.

Using the analysis results as the basis for the test results of the energy storage's active support capability.

Optionally, the step of performing data analysis operations on the processing results to obtain corresponding analysis results includes:

Performing long-term historical data analysis operations on the processing results to obtain long-term historical data analysis results.

Performing fault diagnosis operations on the processing results to obtain fault diagnosis results.

Performing inference analysis operations on the processing results to obtain inference analysis results.

Additionally, to achieve the above objectives, the invention also provides a testing system for enhancing the support capacity of energy storage in integrating new energy into the power grid, characterized in that the testing system includes:

A multi-agent system (MAS) operation platform, used to determine the simulation parameters corresponding to each simulation model based on the target test project, perform parameter regulation operations on each simulation model based on these parameters, simulate the fault information corresponding to the target test project using each simulation model, configure the working state of the physical terminal according to the fault information, determine the fault type and fault level of the physical terminal based on the operating parameters, determine the corresponding fault handling strategy according to the fault type and fault level, and receive the processing results fed back by the physical terminal.

A power hardware-in-the-loop testing platform, used to obtain the operating parameters of the physical terminal and control the physical terminal based on the work state information flow signal of the fault handling strategy.

A physical controller group, used to obtain the operating parameters of the physical terminal and control the physical terminal based on the control instructions of the fault handling strategy.

Optionally, the testing system for enhancing the support capacity of energy storage in integrating new energy into the power grid further includes:

A cloud-edge collaborative data management platform, used for centrally storing the processing results, performing data analysis operations on the processing results to obtain corresponding analysis results, and using the analysis results as the basis for the test results of the energy storage's active support capability.

Furthermore, to achieve the above objectives, the invention also provides a testing device, which includes a memory, a processor, and a testing program for enhancing the support capacity of energy storage in integrating new energy into the power grid stored in the memory and executable on the processor. When executed by the processor, the testing program implements the steps of the aforementioned testing method for enhancing the support capacity of energy storage.

Additionally, the invention provides a computer-readable storage medium that stores a testing program for enhancing the support capacity of energy storage in integrating new energy into the power grid, which, when executed by a processor, implements the steps of the aforementioned testing method.

The invention provides a testing method for enhancing the support capacity of energy storage in integrating new energy into the power grid. By determining the simulation parameters corresponding to each simulation model based on the target test project and performing parameter regulation operations on each simulation model according to these parameters, it ensures that the grid's response and behavior corresponding to the target test project can be accurately simulated during the fault simulation process.

By simulating the fault information corresponding to the target test project based on each simulation model and configuring the working state of the physical terminal according to the fault information, the method extends simulation testing into the real world. This ensures that the fault handling strategies derived from the simulation environment can be accurately executed and verified on real-world physical devices.

By determining the fault type and fault level, the method further identifies the corresponding fault handling strategy to repair or mitigate the impact of the fault. This achieves the goal of ensuring grid stability and reliability in new energy integration.

By receiving the processing results fed back by the physical terminal, the effectiveness of the test is determined based on these results. Such closed-loop control enables rapid adjustment of the simulation model to more accurately simulate real fault conditions.

By adjusting the parameters of the simulation model, the method achieves the goal of adapting to different test scenarios and needs, applicable to various grid configurations and operating conditions. This, in turn, meets the joint simulation needs of large-scale energy storage and new energy integration into the power grid and improves the flexibility and efficiency of testing.

BRIEF DESCRIPTION OF THE DRAWINGS

The drawings herein are incorporated into the specification and form a part of it, illustrating embodiments in accordance with the present invention and, together with the description, are used to explain the principles of the invention. For a clearer illustration of the technical solutions of the embodiments of the present invention, a brief introduction to the drawings required for the description of the embodiments is provided below. It is apparent to those of ordinary skill in the art that, without creative effort, additional drawings can be obtained based on these drawings.

Figure 1:
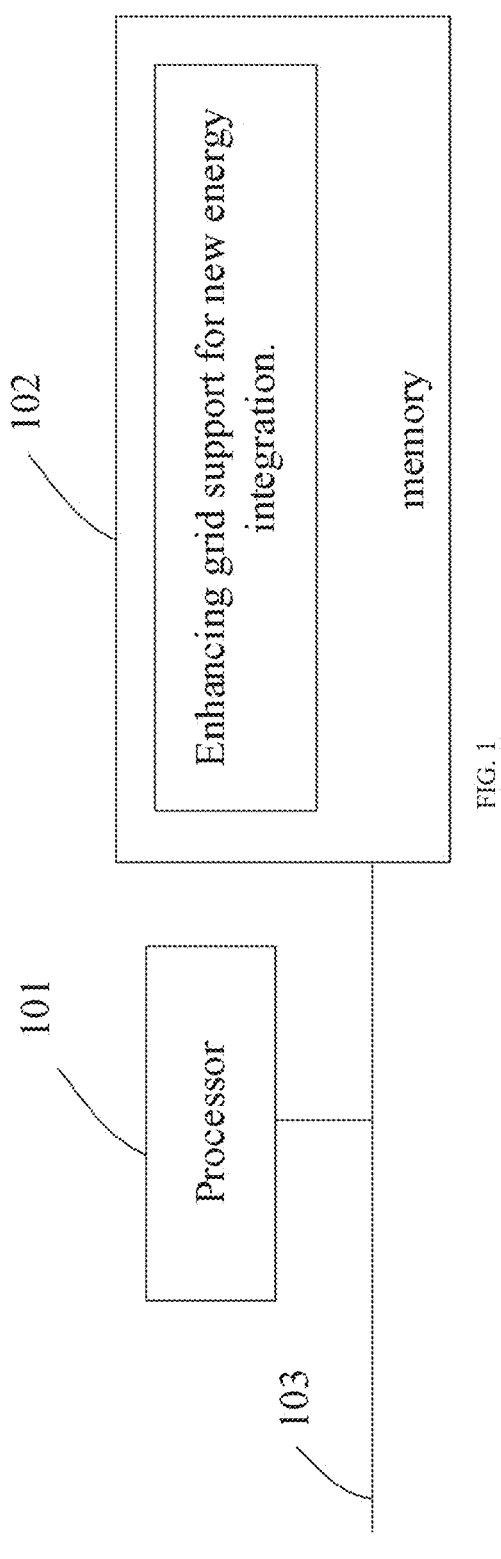
FIG. 1 is a schematic diagram of the hardware operating environment architecture of the testing device related to the embodiments of the present invention.

The realization of the objectives, functional characteristics, and advantages of the present invention will be further explained in conjunction with the embodiments, with reference to the accompanying drawings.

DETAILED DESCRIPTION OF THE EMBODIMENTS

This application presents a testing method for enhancing the support capacity of energy storage in integrating new energy into the power grid. It involves performing parameter regulation operations on each simulation model based on the simulation parameters corresponding to each model as determined by the target test project. Fault information corresponding to the target test project is simulated based on each simulation model, and the working state of the physical terminal is configured according to this fault information. From the operating parameters obtained from the physical terminal, the fault type and fault level of the physical terminal are determined. Based on the fault type and fault level, the corresponding fault handling strategy is determined. The physical terminal is controlled based on the work state information flow signal and control instructions of the fault handling strategy. The processing results fed back by the physical terminal are received. This approach meets the joint simulation needs of large-scale energy storage and new energy integration into the power grid, while also improving the flexibility and efficiency of testing.

To better understand the above technical solutions, exemplary embodiments of the present disclosure will be described in more detail below with reference to the accompanying drawings. While the exemplary embodiments of the present disclosure are shown in the drawings, it should be understood that the present disclosure can be implemented in various forms and should not be limited to the embodiments set forth herein. Rather, these embodiments are provided so that the disclosure can be more thoroughly understood and to fully convey the scope of the disclosure to those skilled in the art.

As an implementation scheme, FIG. 1 is a schematic diagram of the architecture of the hardware operating environment related to the testing device in the embodiment of the present invention.

As shown in FIG. 1, the testing device may include: a processor 101, such as a Central Processing Unit (CPU), a memory 102, and a communication bus 103. The memory 102 may be high-speed Random Access Memory (RAM) or stable Non-Volatile Memory (NVM), such as disk storage. The memory 102 may optionally be a storage device independent of the processor 101. The communication bus 103 is used to achieve communication connections between these components.

It should be understood by those skilled in the art that the structure shown in FIG. 1 does not limit the testing device, and it may include more or fewer components than shown, or combine certain components, or arrange them differently.

As shown in FIG. 1, as a computer-readable storage medium, the memory 102 may include an operating system, data storage module, network communication module, user interface module, and the testing method program for enhancing the support capacity of energy storage in integrating new energy into the power grid.

In the testing device shown in FIG. 1, the processor 101 and memory 102 can be set within the testing device. The testing device invokes the testing method program stored in the memory 102 through the processor 101 and performs the following operations:

Based on the target test project, determine the simulation parameters corresponding to each simulation model and perform parameter regulation operations on each simulation model based on these simulation parameters;

Simulate the fault information corresponding to the target test project based on each simulation model, and configure the working state of the physical terminal according to the fault information;

Obtain the operating parameters of the physical terminal, and determine the fault type and fault level of the physical terminal based on these operating parameters;

Determine the corresponding fault handling strategy based on the fault type and fault level;

Control the physical terminal based on the work state information flow signal of the fault handling strategy and control the physical terminal based on the control instructions of the fault handling strategy;

Receive the processing results fed back by the physical terminal.

In one embodiment, the processor 101 can be used to invoke the testing program stored in memory 102 for enhancing the support capacity of energy storage in integrating new energy into the power grid, and perform the following operations:

Perform parameter regulation operations on the power grid equipment model based on the line structure parameters, operating state parameters, and electrical component parameters within the simulation parameters;

Perform parameter regulation operations on the new energy model based on the working state parameters within the simulation parameters;

Perform parameter regulation operations on the transformer model based on the transformer ratio within the simulation parameters.

In one embodiment, the processor 101 can be used to invoke the testing program stored in memory 102 for enhancing the support capacity of energy storage in integrating new energy into the power grid, and perform the following operations:

Control the start, shutdown, and speed adjustment of the physical terminal according to the work state information flow signal of the fault handling strategy;

Control the restart and line switching of the physical terminal according to the control instructions of the fault handling strategy.

In one embodiment, the processor 101 can be used to invoke the testing program stored in memory 102 for enhancing the support capacity of energy storage in integrating new energy into the power grid, and perform the following operations:

Centrally store the processing results;

Perform data analysis operations on the processing results to obtain the corresponding analysis results;

Use the analysis results as the basis for the test results of the active support capacity of energy storage.

In one embodiment, the processor 101 can be used to invoke the testing program stored in memory 102 for enhancing the support capacity of energy storage in integrating new energy into the power grid, and execute the following operations:

Perform long-term historical data analysis operations on the processing results to obtain long-term historical data analysis results;

Perform fault diagnosis operations on the processing results to obtain fault diagnosis results;

Perform inference analysis operations on the processing results to obtain inference analysis results.

Based on the hardware architecture of the testing device described above, an embodiment of the testing method for enhancing the support capacity of energy storage in integrating new energy into the power grid is proposed.

Figure 2:
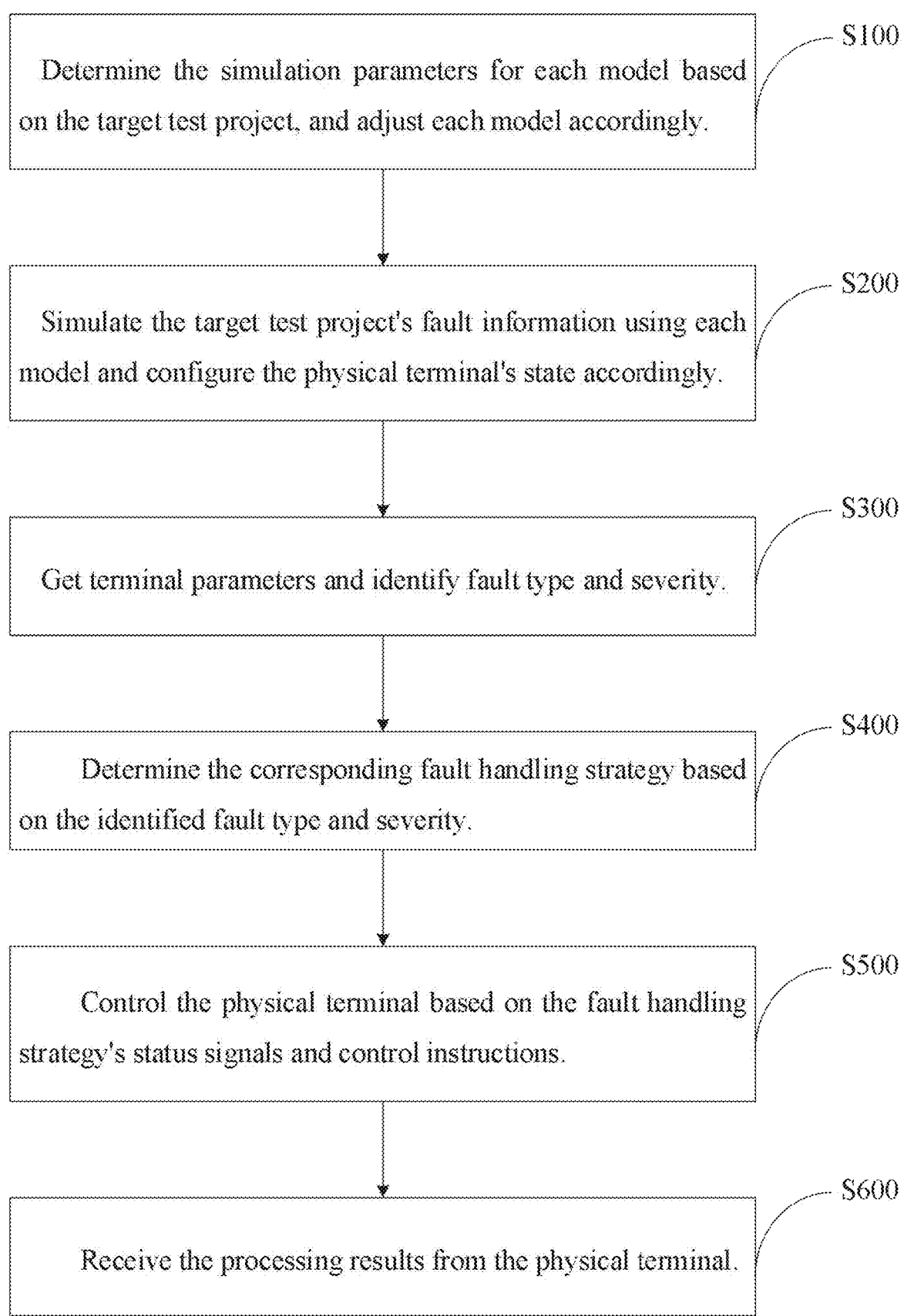
FIG. 2 is a flowchart illustrating the first embodiment of the testing method for enhancing the support capacity of energy storage in integrating new energy into the power grid according to the present invention.

Referring to FIG. 2, in the first embodiment, the testing method for enhancing the support capacity of energy storage in integrating new energy into the power grid includes the following steps:

Step S100: Based on the target test project, determine the simulation parameters corresponding to each simulation model and perform parameter regulation operations on each simulation model based on these simulation parameters.

In this embodiment, the simulation parameters include line structure parameters, operating state parameters, electrical component parameters, working state parameters, and transformer ratio, among others.

Line structure parameters refer to the physical and geometric characteristics of transmission lines in the power system, such as line length, conductor cross-sectional area, material type, and the relative position between lines. These parameters affect the resistance, inductance, capacitance, transmission efficiency, and signal propagation speed of the line.

Operating state parameters involve the working conditions of the power grid at a specific point in time, including voltage level, current intensity, power flow, frequency, load level, etc. These parameters describe the operational status of the power grid at a given moment.

Electrical component parameters refer to the characteristics of the various components that make up the power system, such as the turn ratio and capacity of transformers, the breaking capacity of circuit breakers, and the compensation level of capacitors and reactors.

Working state parameters refer to the operating modes and output characteristics of new energy equipment such as wind turbines and photovoltaic panels, including power generation, power factor, output voltage, and frequency. These parameters help assess the impact of new energy on grid performance when simulating the integration of new energy into the power grid.

The transformer ratio refers to the conversion ratio used in voltage transformers or current transformers in the power grid, which convert high voltage or large current to lower values for measurement and protection devices.

Optionally, perform parameter regulation operations on the power grid equipment model based on the line structure parameters, operating state parameters, and electrical component parameters within the simulation parameters; perform parameter regulation operations on the new energy model based on the working state parameters within the simulation parameters, perform parameter regulation operations on the transformer model based on the transformer ratio within the simulation parameters.

In this embodiment, parameter regulation is performed on the power grid equipment model, new energy model, and transformer model according to the target test project to ensure that each simulation model can simulate the simulation parameters corresponding to the test project. This ensures that during fault simulation, the grid response and behavior corresponding to the target test project can be accurately simulated.

Step S200: Based on each simulation model, simulate the fault information corresponding to the target test project, and configure the working state of the physical terminal according to this fault information.

In this embodiment, after completing the parameter regulation operations on each simulation model, the fault information corresponding to the target test project is simulated based on each simulation model, and the working state of the physical terminal is configured according to the fault information.

Optionally, fault information can correspond to faults such as line short circuits, equipment failures, communication interruptions, sensor failures, and so on. Fault information includes, but is not limited to, data such as fault type, fault location, and fault time.

Step S300: Obtain the operating parameters of the physical terminal, and determine the fault type and fault level of the physical terminal based on these operating parameters.

In this embodiment, after the physical terminal accesses the simulated fault information, the fault type and fault level of the physical terminal are determined based on the obtained operating parameters. It can be understood that the operating parameters include, but are not limited to, parameters such as voltage, current, temperature, and power of the physical terminal.

Optionally, after obtaining the operating parameters of the physical terminal, the consistency of these operating parameters with the normal operating parameters is determined. When the consistency exceeds a preset error range, a fault in the physical terminal is identified, and further, the fault type and fault level of the physical terminal are determined based on the operating parameters.

In one optional embodiment, in a power grid system, slight voltage fluctuations can affect the lifespan of the physical terminal, while severe voltage drops may lead to damage to the physical terminal or instability in the power grid system. When the voltage parameter in the operating parameters exceeds the preset voltage error range, the fault type is further determined to be a voltage drop or voltage surge, and the fault level of the voltage drop or surge is determined based on the extent to which the voltage parameter exceeds the preset voltage error range.

In another optional embodiment, in a power grid system, if the frequency parameter of the physical terminal is too high or too low, it indicates an imbalance between generation and load. Such frequency deviations can damage the physical terminal, especially those devices sensitive to frequency changes. If the frequency parameter in the operating parameters deviates from the standard value (e.g., 50 Hz or 60 Hz), the fault type is further determined to be a system stability fault, meaning the preset frequency error range is zero. The fault level of the system stability fault is then determined based on the magnitude and speed of the frequency parameter change.

Step S400: Determine the corresponding fault handling strategy based on the fault type and fault level Step S500: Control the physical terminal according to the work state information flow signal of the fault handling strategy and the control instructions of the fault handling strategy.

Optionally, the start, stop, and speed adjustment of the physical terminal are controlled according to the work state information flow signal of the fault handling strategy; the restart and line switching of the physical terminal are controlled according to the control instructions of the fault handling strategy.

Step S600: Receive the processing results fed back by the physical terminal.

Furthermore, after receiving the processing results fed back by the physical terminal, centrally store these processing results; perform data analysis operations on the processing results to obtain corresponding analysis results; use these analysis results as the basis for the test results of the active support capacity of energy storage.

Optionally, perform long-term historical data analysis operations on the processing results to obtain long-term historical data analysis results; perform fault diagnosis operations on the processing results to obtain fault diagnosis results; perform inference analysis operations on the processing results to obtain inference analysis results.

In the technical solution provided in this embodiment, by determining the simulation parameters corresponding to each simulation model based on the target test project and performing parameter regulation operations on each simulation model based on these simulation parameters, it ensures that during the fault simulation process, the grid response and behavior corresponding to the target test project can be precisely simulated. By simulating the fault information corresponding to the target test project based on each simulation model and configuring the working state of the physical terminal according to the fault information, the extension from simulation testing to the real world is achieved, ensuring that the fault handling strategies derived in the simulation environment can be accurately executed and verified on real-world physical devices. By determining the fault type and fault level, an appropriate fault handling strategy is determined to repair or mitigate the impact of the fault, achieving the goal of ensuring the stability of the power grid and the reliability of new energy integration. By receiving the processing results fed back by the physical terminal, the effectiveness of the test is determined based on these results. Such closed-loop control allows for the rapid adjustment of simulation models to more accurately simulate real-world fault conditions. By adjusting the parameters of the simulation models, it aims to adapt to different test scenarios and requirements, applicable to various grid configurations and operating conditions, thereby meeting the joint simulation needs of large-scale energy storage and new energy integration into the grid, and improving the flexibility and efficiency of testing.

Figure 3:
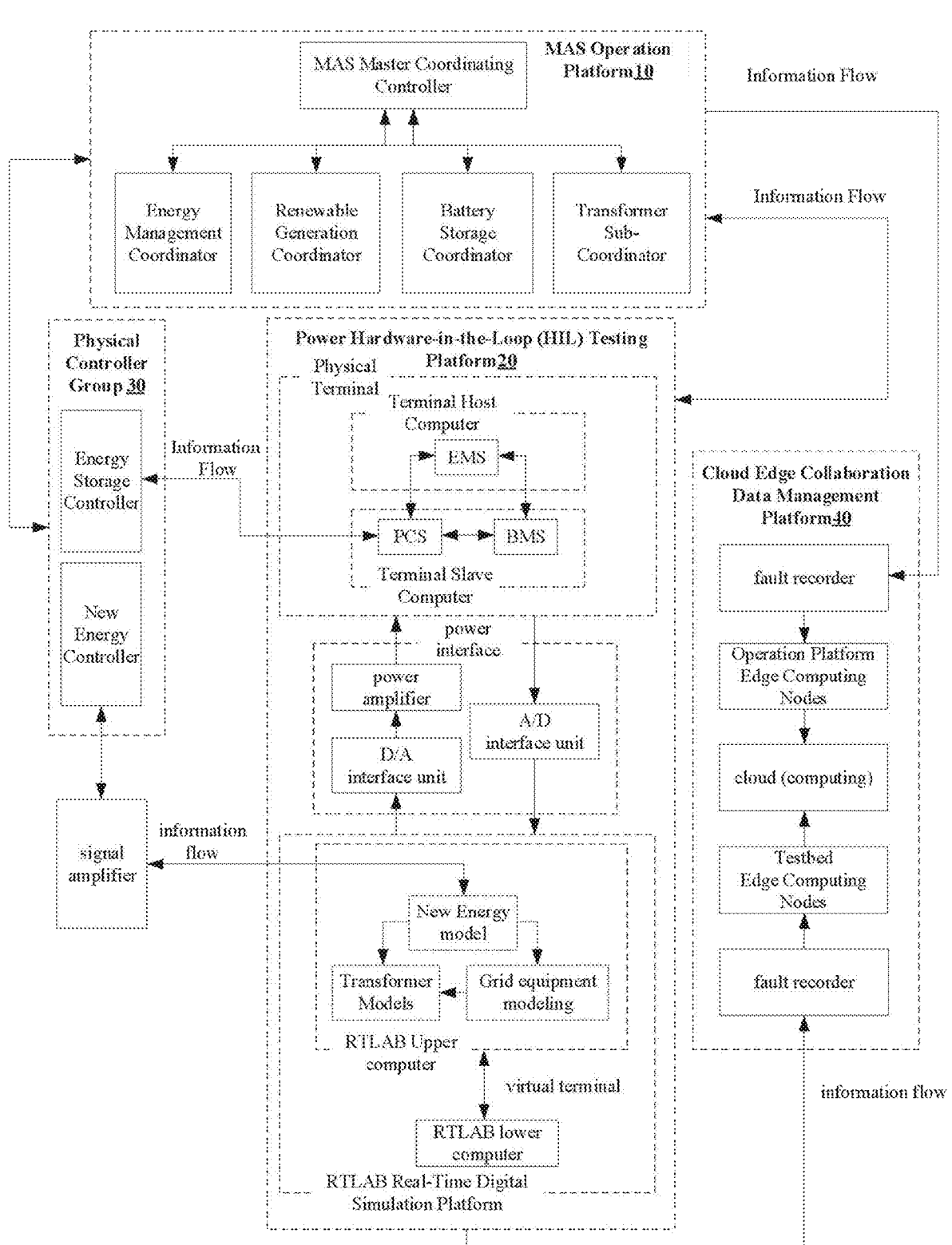
FIG. 3 is a schematic diagram of the system architecture for the testing method of enhancing the support capacity of energy storage in integrating new energy into the power grid according to the present invention.

Additionally, referring to FIG. 3, this embodiment also proposes a testing system for enhancing the support capacity of energy storage in integrating new energy into the power grid, characterized in that the system includes:

An MAS operation platform 10, used for determining the simulation parameters corresponding to each simulation model based on the target test project, and performing parameter regulation operations on each simulation model based on these simulation parameters; simulating the fault information corresponding to the target test project based on each simulation model; configuring the working state of the physical terminal according to the fault information; determining the fault type and fault level of the physical terminal based on the operating parameters; determining the corresponding fault handling strategy based on the fault type and fault level; and receiving the processing results fed back by the physical terminal.

A power hardware-in-the-loop testing platform 20, used for obtaining the operating parameters of the physical terminal and controlling the physical terminal according to the work state information flow signal of the fault handling strategy.

A physical controller group 30, used for obtaining the operating parameters of the physical terminal and controlling the physical terminal according to the control instructions of the fault handling strategy.

Furthermore, the testing system for enhancing the support capacity of energy storage in integrating new energy into the power grid also includes a cloud-edge collaborative data management platform 40, used for centrally storing the processing results, performing data analysis operations on the processing results to obtain corresponding analysis results, and using these analysis results as the basis for the test results of the active support capacity of energy storage.

In this embodiment, a digital simulation system composed of an RTLAB host, virtual terminal, and RTLAB slave is built using the RTLAB real-time digital simulation platform.

The RTLAB host is primarily used for model building, visual monitoring, debugging, and parameter adjustment.

Model building involves using RTLAB software to construct multiple subsystem models, convert them into RTLAB-compatible formats, compile the models into C code, and load them into the RTLAB slave. The subsystem models include mathematical models of power systems, such as new energy models, power grid equipment models, and transformer models, with the new energy model able to communicate bidirectionally with the new energy physical controller through signal amplifiers for control signals and status feedback.

The power grid equipment model is composed of various electrical components with a line topology structure, used to simulate the operation of primary power grid equipment. Its regulation parameters include line structure parameters, operating state parameters, and electrical component parameters.

The new energy model is controlled by the power grid equipment model and is used to simulate the working state of new energy and energy storage equipment.

The transformer model is mainly composed of current transformers and voltage transformers with different turn ratios, used for setting the transformer ratio of the power grid equipment model and new energy model or collecting information on changes in transformers within these models during operation.

The new energy model can communicate bidirectionally with the new energy physical controller through a signal amplifier for control signals and status feedback information. The new energy physical controller is used to calculate and generate control signals based on the control instructions issued by the MAS operation platform 10. These control signals are amplified and buffered by the signal amplifier and then transmitted to the new energy model. The new energy model generates corresponding status feedback information based on the input control signals, which is then reduced and buffered by the signal amplifier and transmitted back to the new energy physical controller.

Visual monitoring involves using the RTLAB host to view real-time simulation results and measured data displayed through visual elements such as charts and numbers, thereby maintaining real-time monitoring of the entire large-scale energy storage active support capacity testing system.

Debugging involves confirming control strategies by monitoring the simulation operation process of the RTLAB slave and performing debugging and optimization based on the operation results and equipment status of the slave.

Parameter adjustment is achieved through real-time communication between the RTLAB host and the RTLAB slave, allowing the RTLAB host to adjust and modify simulation parameters in real-time during the simulation process for better control of the large-scale energy storage active support capacity testing system.

In this embodiment, the virtual terminal connects the RTLAB upper computer and the RTLAB lower computer. The logic judgment module in the virtual distribution terminal can implement functions such as delayed closing upon power return, no-voltage tripping, forward locking, reverse locking, single-side power loss closing, dual-pressure locking, and reclosing. These functions can coordinate with the physical terminal to achieve hardware-in-the-loop simulation research.

The RTLAB lower computer uses parallel processing technology to allow the power grid to run in real-time with microsecond-level small time steps, thereby achieving the goal of accurately simulating various electromagnetic transients in the power grid. As the testing system runs in real-time simulation, the RTLAB lower computer continuously generates electrical data and simultaneously receives real-time measured data from the physical terminal. It generates corresponding control signals based on the received measured data to control the physical terminal in real-time.

In this embodiment, the physical terminal representing a large-scale energy storage system—including the energy management system, storage inverter, and battery management system—is connected to the digital simulation system through a power interface, forming a power hardware-in-the-loop testing platform.

In this testing system, the physical terminal represents a large-scale energy storage system, consisting of the energy management system, storage inverter, and battery management system. It can connect to the MAS operation platform via a power interface, forming the power hardware-in-the-loop testing platform of the RTLAB semi-physical simulation platform. It should be noted that the MAS operation platform here refers to a platform that enhances the active support capacity of large-scale energy storage for integrating high proportions of new energy into the power grid.

Structurally, the power hardware-in-the-loop testing platform is a testing platform composed of hardware devices and software packages. Its semi-physical simulation process allows the integration of some physical components into the system, namely the energy management system, storage inverter, and battery management system representing the large-scale energy storage system. During testing, the power hardware-in-the-loop testing platform can examine the large-scale energy storage system as a physical component within the system.

Operationally, staff only need to operate on the human-machine interface of the power hardware-in-the-loop testing platform to regulate the corresponding model parameters.

The battery management system is used to manage and protect the battery pack to ensure its safe operation and optimal performance. Specifically, the battery management system measures basic battery parameters, including voltage, current, and temperature; it obtains the battery status, such as State of Charge (SOC) and State of Health (SOH), through data collection and calculation analysis; it shares the battery pack status information with the energy management system and storage inverter for energy management; and it performs intelligent control of the battery pack according to the control information issued by the energy management system, adjusting charging/discharging strategies to optimize battery usage efficiency and extend battery life.

The energy management system is used for real-time optimization and scheduling decisions regarding system-level energy and power grid demand response, ensuring maximum benefits of energy storage in the power system. Specifically, the energy management system receives status information output from the battery management system and storage inverter to monitor the normal operation of energy storage devices, and performs fault diagnosis and maintenance management; it issues control information to the storage inverter based on high-level operational goals to control battery charging and discharging operations to meet energy balance control. It should be noted that these high-level operational goals include responding to grid demands, ensuring system safety, and economic optimization; control information includes operation mode switching and reactive power compensation, with operation modes being grid-connected or off-grid. Additionally, the energy management system issues adjustment control information to the battery management system based on the battery's safety and efficiency maintenance goals to avoid affecting battery life due to excessive charging and discharging. Control information includes parameters such as the battery pack's charging and discharging rate and state of charge.

The storage inverter is used to control and execute the charging and discharging process of the energy storage battery pack. Specifically, the storage inverter receives status information output from the battery management system to ensure that the battery pack operates within a safe range, with status information including battery voltage, temperature, current, and remaining capacity. The storage inverter also receives control information output from the energy management system based on high-level operational goals, which include operational goals such as responding to grid demands and ensuring system safety. The storage inverter receives output instructions from the storage physical controller and sends command responses to confirm receipt and provide feedback on execution status, including updates on the battery pack, using information flow signals. The output instructions from the storage physical controller involve fine-tuned control of the storage inverter's parameters based on EMS framework instructions for charging current, power factor, and discharge depth. The storage inverter also executes and manages the charging and discharging processes of the energy storage battery pack in real-time and reports the battery pack status information to the energy management system for overall energy management and optimization.

In this implementation, the power interface consists of a D/A interface device, an A/D interface device, and a power amplifier. The power interface allows the RTLAB real-time digital simulation platform to directly connect with the physical terminal, enabling the expansion from signal-level real-time simulation to power-level simulation. It also amplifies signals, allowing the physical terminal and the RTLAB real-time digital simulation platform to operate and return work status information flow signals. Specifically, the forward channel of the power interface converts low-level digital signals output from the RTLAB real-time digital simulation platform into power-level electrical data receivable by the physical terminal through the D/A interface device, then amplifies and conducts these signals into the physical power equipment via the power amplifier, forming a power exchange channel. The backward channel of the power interface converts power-level electrical data, measured by the physical terminal, into low-level digital signals receivable by the RTLAB real-time digital simulation platform through the A/D interface device, and then conducts these signals to the RTLAB real-time digital simulation platform. Compared to the forward channel, the backward channel of the power interface only has a measurement sampling function.

In this embodiment, a scalable energy storage active support capability testing system is formed based on the power hardware-in-the-loop testing platform, physical controller group, and MAS operation platform, creating a real-time, dynamic closed-loop control process to achieve real-time optimization and stable operation of the system. The MAS operation platform enhances the active support capability of large-scale energy storage for integrating high proportions of new energy into the power grid.

The MAS operation platform integrates global information and conducts global monitoring and management of the entire testing system, improving testing efficiency through distributed coordination, thus reducing the burden on the MAS master coordination controller. Its control structure includes a MAS master coordination controller and various sub-coordination controllers. The MAS master coordination controller is divided into energy management sub-coordination controller, new energy generation sub-coordination controller, battery storage sub-coordination controller, and transformer sub-coordination controller based on system topology to enable communication and interaction among different sub-coordination controllers through the MAS master coordination controller.

The MAS master coordination controller schedules and manages each sub-coordination controller uniformly, ensuring coordinated operation among subsystems to avoid conflicts or chaos. It optimizes and adjusts each sub-coordination controller according to the operational state and requirements of the scalable energy storage active support capability testing system, improving the efficiency and reliability of the entire system.

Sub-coordination controllers are branches in large-scale coordinated control. The energy management sub-coordination controller, under the MAS master coordination controller, is responsible for overall energy management. The new energy generation sub-coordination controller, under the MAS master coordination controller, coordinates the monitoring and control of new energy generation equipment, such as solar photovoltaic and wind power generation. The battery storage sub-coordination controller, under the MAS master coordination controller, is responsible for monitoring and controlling the battery storage system. The transformer sub-coordination controller, under the MAS master coordination controller, is responsible for monitoring and controlling transformer equipment, including functions such as overvoltage and overcurrent protection and fault detection. All the above sub-coordination controllers directly receive information flow signals output from the power hardware-in-the-loop testing platform and return work status information flow signals to the power hardware-in-the-loop testing platform. These information flow signals include analog and switch quantities.

Optionally, the MAS master coordination controller connects to the network of each sub-coordination controller through a network switch, and the network signal output of the network switch connects to the power hardware-in-the-loop testing platform. Specifically, the MAS master coordination controller connects to the energy management sub-coordination controller, new energy generation sub-coordination controller, battery storage sub-coordination controller, and transformer sub-coordination controller networks through the network switch, with the network signal output of the network switch connected to the power hardware-in-the-loop testing platform.

Optionally, the MAS operation platform, which enhances the active support capability of large-scale energy storage for integrating high proportions of new energy into the power grid, can be expanded by adding other electrical equipment, thus integrating the functions of other electrical equipment into the platform for more comprehensive management and control.

Specifically, for equipment that needs to be added to the system operation process, its interface device connects with the interface device of the power hardware-in-the-loop testing platform. This means the MAS operation platform for enhancing the active support capability of large-scale energy storage is only one implementation. For different operation platforms, parameter control can be adjusted according to their needs, and the connection method of physical equipment can be changed according to reality to flexibly increase the applicability of the operation testing platform, thus improving the testing level and scalability of the operation testing platform.

Optionally, the power hardware-in-the-loop testing platform outputs information flow signals, including analog and switch quantities, to both the physical controller and the MAS operation platform to achieve a real-time dynamic forward control process for the scalable energy storage active support capability testing system.

Specifically, based on the testing requirements of the MAS operation platform, testing projects are formulated, including line testing projects, operational state testing projects, electrical component testing projects, new energy testing projects, energy storage testing projects, and transformer testing projects. These projects mainly consist of fault and abnormal testing projects. Power grid equipment fault simulation projects include faults in different types, fault resistances, and fault locations, as well as transformer internal ground faults, inter-turn faults, bus faults, reactor faults, all contained in the line testing projects and electrical component testing projects. Power grid equipment abnormal condition simulation projects include frequency deviation, system oscillation, transmission line overload, voltage fluctuations, all included in the operational state testing projects. New energy field station fault simulation projects include faults in wind turbines and photovoltaic power sources, and energy storage body faults, all contained in the new energy testing projects. Transformer abnormal simulation projects include current transformer saturation, current transformer disconnection, voltage transformer disconnection, all contained in the transformer testing projects.

Then, based on the formulated testing projects, the power hardware-in-the-loop testing platform simulates various testing scenarios and conducts simulation tests. According to the simulation test results, the power hardware-in-the-loop testing platform generates corresponding information flow signals, including analog and switch quantities. Finally, under this operating condition, the power hardware-in-the-loop testing platform outputs information flow signals, including analog and switch quantities, to the MAS operation platform and physical controller group. The physical controller group includes the energy storage physical controller and the new energy physical controller.

The MAS operation platform outputs control instructions and information flow signals to the physical controller group and the power hardware-in-the-loop testing platform, achieving a real-time dynamic reverse control process for the scalable energy storage active support capability testing system.

Specifically, the MAS operation platform operates based on information flow signals, including analog and switch quantities, output from the power hardware-in-the-loop testing platform, while collecting real-time feedback data from the power hardware-in-the-loop testing platform and the physical controller group, including key parameters such as voltage, current, temperature, frequency, and the current operating status of the testing platform. The MAS operation platform analyzes and processes this data, and based on the adjusted control strategy, returns work state information flow signals to the power hardware-in-the-loop testing platform and issues control instructions to the physical controller group. The energy storage physical controller and new energy physical controller in the physical controller group execute corresponding control algorithms on the energy storage inverter in the physical terminal and the new energy model in the RTLAB real-time digital simulation platform based on the instructions issued by the master coordination controller, achieving real-time optimization and stable operation of the system. Meanwhile, the power hardware-in-the-loop testing platform can implement functions such as starting, stopping, and speed adjustment of devices by changing the operating status of equipment on the testing platform based on the returned information flow signals, including analog and switch quantities, to further verify the performance and stability of the testing platform and method under different operating conditions.

In this implementation, the MAS operation platform determines the simulation parameters corresponding to each simulation model based on the target testing project. It then performs parameter regulation operations on each simulation model based on these simulation parameters, enabling the testing system for energy storage to enhance new energy grid integration support capability to simulate the working state corresponding to the testing project. Subsequently, the system is started and debugged to ensure normal operation. The power hardware-in-the-loop testing platform triggers faults, and based on the returned work status information flow signals, the tested terminal is activated for fault processing.

The MAS operation platform adjusts parameters for the grid equipment model, new energy model, and transformer model according to the testing project, enabling the testing system for energy storage to simulate the working state corresponding to the testing project, and configures the physical terminal to access relevant fault information.

Specifically, according to the requirements of the testing project, line structure parameters, operational state parameters, and electrical component parameters within the grid equipment model are regulated. The working state of the new energy model is set, and the transformer ratio of the transformer model is configured to ensure consistency with the testing project requirements. This allows the system to simulate the working state corresponding to the testing project.

After configuring the parameters of the grid equipment model, new energy model, and transformer model, and starting the system, the system monitors changes in the output signals of the MAS operation platform and transformer information after a certain period of operation. These are compared with the data displayed by the system. If consistent, the network connection within the cluster energy storage operation platform is checked. If the connection is normal, both the system and the cluster energy storage operation platform enter a normal and stable operating state.

If inconsistencies are found, the internal network connection of the MAS operation platform is checked and debugged to ensure normal connection. Subsequently, system parameters are adjusted to change the working state of the MAS operation platform. Monitoring and comparison of the output signals from the MAS operation platform and changes in transformer information are repeated until the data is consistent.

The testing platform triggers faults via the RTLAB digital simulator. In this state, the tested terminal is activated and performs fault processing based on the returned work status information flow signals. During testing, a single variable method is used, where in a normally stable system, a specific parameter is changed independently to simulate specific fault scenarios, enabling testing of anomalies in single projects. This method is often used in testing projects for electrical components or transformers. For more complex conditions requiring simultaneous regulation of multiple parameters, real operational parameters reflected by the MAS operation platform under specific conditions are simulated to obtain corresponding test results. These are then compared with set theoretical parameters to evaluate the control performance level of the MAS operation platform.

Specifically, after a fault occurs, the MAS operation platform collects key parameters from feedback by the power hardware-in-the-loop testing platform and the physical controller group, including voltage, current, temperature, frequency, and the current operational state of the testing platform. The MAS operation platform then analyzes this information to determine the type and level of the fault, thereby adopting appropriate processing strategies and measures to ensure the stable operation of the scalable energy storage active support capability testing system.

Next, the MAS operation platform determines the corresponding fault handling strategies, such as self-healing, alarms, and switching backup equipment, based on the fault type and level. The MAS operation platform can return work status information flow signals to the power hardware-in-the-loop testing platform and issue control instructions to the physical controller group to ensure timely fault handling and control.

Then, equipment on the testing platform performs functions such as start-up, shutdown, and speed adjustment based on the work status information flow signals returned by the MAS operation platform. The energy storage physical controller and new energy physical controller within the physical controller group execute corresponding control algorithms on the energy storage inverter in the physical terminal and the new energy model in the RTLAB real-time digital simulation platform based on instructions issued by the master coordination controller. This allows the tested terminal to operate according to the determined processing strategies, such as rebooting equipment and automatically switching lines, ensuring that the tested terminal takes correct actions during faults, thereby safeguarding the stability of the power grid.

Finally, after processing is completed, the tested terminal feeds back the processing results to the MAS operation platform for a comprehensive understanding of the fault handling situation. By collecting feedback information, the MAS operation platform can continue subsequent analysis and decision-making to monitor and manage the fault handling process in real-time.

In this implementation, the cloud-edge collaborative data management platform processes the Sequence of Event (SOE) information and switch action information output by the power hardware-in-the-loop testing platform and the MAS operation platform. It regards subordinate fault recorders as second-level ends, edge computing nodes as minute-level edges, and the cloud as greater than 10-minute clouds according to different coverage time ranges. It then conducts step-by-step monitoring and analysis of the received test data. Based on test results and needs, long-term historical data analysis, advanced fault diagnosis, and reasoning, among other big data analyses, are conducted to provide a basis for testing the active support capability of energy storage.

The fault recorder in the cloud-edge collaborative data management platform is located at the most terminal monitoring point, responsible for second-level real-time monitoring, recording fault events, and changes in electrical parameters over time. It preprocesses, cleans, buffers, and forwards the vast amount of data generated during testing.

The power hardware-in-the-loop testing platform is equipped with a fault recorder to receive test data returned from the platform, achieving independent fault recording and analysis to ensure the platform's independence, avoiding interference from other platforms on test results. Optionally, the fault recorder monitors and records specific data and state information during testing, including current, voltage, temperature, equipment operating status, and control signals, to accurately assess equipment performance and stability from multiple dimensions, ensuring the accuracy and reliability of test results.

The MAS operation platform has a fault recorder for receiving test data returned from the platform, achieving independent fault recording and analysis to ensure platform independence, avoiding other platforms' interference with test results. Optionally, the MAS operation platform's fault recorder monitors and records operating equipment fault data, including overload, short-circuit, and data anomalies, requiring extensive real-time data change recording to reflect the electrical equipment's performance and fault situations overall, to enable timely maintenance and protection measures, ensuring normal equipment operation and power system stability.

Edge computing nodes execute minute-level data processing and analysis tasks near the data source, known as "edge," conducting real-time processing and analysis onsite where data is generated, performing trend analysis, early warning, feature extraction, fault diagnosis, and other data calculations and storage tasks.

The operational edge computing nodes execute data processing and analysis tasks near the MAS operation platform data source, receiving processed data from the platform via the fault recorder, conducting respective data calculations and storage tasks. The testing edge computing nodes execute data processing and analysis tasks near the power hardware-in-the-loop testing platform data source, receiving processed data from the platform via the fault recorder, conducting respective data calculations and storage tasks.

The operational edge computing nodes and testing edge computing nodes upload SOE information, switch action information, and analysis data on test results to the cloud. As a big data analysis platform, the cloud focuses on centralized storage, deep analysis, and multidimensional visualization of data larger than 10 minutes, known as "cloud." The cloud provides powerful computing and storage capabilities, conducting long-term historical data analysis, advanced fault diagnosis, and reasoning, among other big data analyses, on test data processed by fault recorders and edge computing nodes, providing the basis for testing the active support capability of energy storage.

In the technical solution provided by this implementation, the power hardware-in-the-loop testing platform is configured for the planned scalable energy storage active support capability testing system to construct a virtual-real combined digital-physical hybrid simulation testing environment. By building simulations via software for grid equipment models, new energy models, and transformer models, it not only avoids the high costs and large quantities associated with existing new energy and energy storage device physical dynamic models but also meets the joint simulation needs of large-scale new energy and energy storage grid integration. Simultaneously, its semi-physical simulation process allows partial physical integration into the system, such as energy management systems, storage inverters, and battery management systems representing large-scale energy storage systems, enabling examination of large-scale energy storage systems as physical components during testing, thereby enhancing the reliability and accuracy of the scalable energy storage active support capability testing system.

In the technical solution provided by this embodiment, the planned large-scale energy storage active support capability testing system is configured with a MAS operation platform with a layered, distributed coordination structure. This enhances the accuracy of power system control. The optimized distributed organizational structure not only improves the response speed and execution efficiency of overall coordination control but also reduces communication overhead and computational workload, effectively avoiding the coordination inefficiency issues that traditional control methods based on precise mathematical models may cause.

In this embodiment, the planned large-scale energy storage active support capability testing system is equipped with a cloud-edge collaborative data management platform that uses cloud-edge collaborative technology for step-by-step monitoring and analysis of test data. The combination of fault recorders, edge computing nodes, and the cloud not only enhances the flexibility and efficiency of testing but also allows for long-term historical data analysis, advanced fault diagnosis, and reasoning based on actual needs. This effectively overcomes the limitations of traditional monitoring systems, which struggle to monitor and analyze complex data and equipment states effectively in smart grids.

The technical solution provided by this embodiment relies on the power hardware-in-the-loop testing platform, the MAS operation platform, and the cloud-edge collaborative data management platform. Through their collaboration in constructing simulation testing environments, overall coordination control of power systems, and data processing and analysis, it optimizes the accuracy, flexibility, and efficiency of the tests. This ensures that the testing system effectively validates and leverages the testing platform and methods during simulations of basic fault handling capabilities and fault tolerance capability tests for energy storage active support.

Additionally, it is understood by those skilled in the art that all or part of the processes in the above-described implementation method can be directed by computer programs to complete. These computer programs include program instructions that can be stored in a storage medium, which is a computer-readable storage medium. The program instructions are executed by at least one processor in the testing equipment to achieve the steps of the implementation method described above.

It should be noted that the system implementations described above are merely illustrative. Components such as the power hardware-in-the-loop testing platform, the MAS operation platform for enhancing high-proportion new energy grid integration support capabilities, the physical controller group, signal amplifiers, and the cloud-edge collaborative data management platform can be separate parts or not physically separate. The display function on the power hardware-in-the-loop testing platform may or may not be a physical unit, it can be located in one place or mapped to the terminal backend via a network. Parts or all of these devices can be selected according to actual needs to achieve the objectives of this embodiment. Furthermore, the connections between devices in the system implementation diagrams provided by this invention indicate communication connections, which can be implemented as one or more communication buses or signal lines. It can be understood and implemented by those skilled in the art without creative effort.

Therefore, this invention also provides a computer-readable storage medium that stores a testing program for enhancing energy storage grid integration support capabilities. When executed by a processor, the testing program implements the steps of the testing method for enhancing energy storage grid integration support capabilities as described in the above embodiments.

The computer-readable storage medium can be various forms of storage media capable of storing program code, such as USB drives, mobile hard drives, read-only memory (ROM), magnetic disks, or optical discs.

It should be noted that since the storage media provided by the embodiments of this application are used to implement the methods of this application, based on the methods described in this application, those skilled in the art can understand the specific structure and variations of this storage medium, and thus it is not detailed here. Any storage media used by the methods of this application are intended to be within the protective scope of this application.

Those skilled in the art should understand that embodiments of the invention can be provided as methods, systems, or computer program products. Therefore, the invention can be implemented in the form of entirely hardware implementations, entirely software implementations, or a combination of software and hardware aspects. Additionally, the invention can be in the form of a computer program product implemented on one or more computer-usable storage media that contain computer-usable program code (including but not limited to disk storage, CD-ROM, optical storage, etc.).

The invention is described with reference to flowcharts and/or block diagrams of methods, apparatus (systems), and computer program products according to embodiments of the invention. It should be understood that each flow and/or block in the flowcharts and/or block diagrams, as well as combinations of flows and/or blocks, can be implemented by computer program instructions. These computer program instructions can be provided to a general-purpose computer, a special-purpose computer, an embedded processor, or other programmable data processing apparatus to create a machine that executes the instructions to produce a device for implementing the functions specified in one or more flows in the flowchart and/or one or more blocks in the block diagram.

These computer program instructions can also be stored in a computer-readable memory that can direct a computer or other programmable data processing apparatus to function in a particular manner, such that the instructions stored in the computer-readable memory produce an article of manufacture that includes instruction means that implement the functions specified in one or more flows in the flowchart and/or one or more blocks in the block diagram.

These computer program instructions can also be loaded onto a computer or other programmable data processing apparatus to cause a series of operational steps to be executed on the computer or other programmable apparatus to produce a computer-implemented process, such that the instructions executed on the computer or other programmable apparatus provide steps for implementing the functions specified in one or more flows in the flowchart and/or one or more blocks in the block diagram.

It should be noted that any reference number in parentheses in the claims should not be construed as limiting the claims. The word "including" does not exclude the presence of elements or steps not listed in the claims. The use of the words "a" or "an" before components does not exclude the presence of multiple such components. The invention can be implemented by hardware that includes several different components and by appropriately programmed computers. In the enumerated unit claims, several of these devices can be embodied by the same hardware item. The use of terms such as first, second, and third does not indicate any sequence. These words can be interpreted as names.

Although preferred embodiments of the invention have been described, those skilled in the art, once they know the basic inventive concept, can make further modifications and variations to these embodiments. Therefore, the appended claims are intended to be interpreted as including preferred embodiments as well as all changes and modifications that fall within the scope of the invention.

It is apparent that those skilled in the art can make various changes and modifications to the invention without departing from the spirit and scope of the invention. Thus, if such modifications and variations of the invention fall within the scope of the claims and their equivalents, the invention is also intended to include these changes and modifications.

What is claimed is:

1. A method for testing a system for enhancing a grid-supporting capability of an energy storage integrated with a renewable energy, wherein the system comprises:

a multi-agent system (MAS) operation platform, configured to determine simulation parameters corresponding to a plurality of simulation models based on a target testing project, perform parameter adjustment operations on the plurality of simulation models based on the simulation parameters, simulate fault information corresponding to the target testing project based on the plurality of simulation models, configure a working state of physical terminals based on the fault information, determine fault types and fault levels of the physical terminals based on operational parameters, determine a fault handling strategy based on the fault types and the fault levels, wherein the fault handling strategy is specifically selected for determined fault types and fault levels, and receive handling results fed back by the physical terminals;

a power hardware-in-the-loop testing platform, configured to obtain the operational parameters of the physical terminals and control the physical terminals based on an information flow signal of a working state of the fault handling strategy;

a group of physical controllers, configured to obtain the operational parameters of the physical terminals and control the physical terminals based on control instructions of the fault handling strategy; and a cloud-edge collaborative data management platform, configured to centrally store the handling results, perform data analysis operations on the handling results to obtain analysis results, and use the analysis results as a basis for testing results of an active supporting capability of the energy storage;

wherein the method comprises:

determining the simulation parameters corresponding to the plurality of simulation models based on the target testing project and performing the parameter adjustment operations on the plurality of simulation models based on the simulation parameters;

simulating the fault information corresponding to the target testing project based on the plurality of simulation models and configuring the working state of the physical terminals based on the fault information;

obtaining the operational parameters of the physical terminals and determining the fault types and the fault levels of the physical terminals based on the operational parameters;

determining the fault handling strategy based on the fault types and the fault levels;

controlling the physical terminals based on the information flow signal of the working state of the fault handling strategy and controlling the physical terminals based on the control instructions of the fault handling strategy, wherein the information flow signal and the control instructions are generated from the determined fault handling strategy and are distinct signal types for different levels of control;

receiving the handling results fed back by the physical terminals; and centrally storing the handling results, performing the data analysis operations on the handling results to obtain the analysis results, and using the analysis results as the basis for the testing results of the active supporting capability of the energy storage;

wherein performing the parameter adjustment operations on the plurality of simulation models based on the simulation parameters comprises:

adjusting parameters of a power grid equipment model based on line structure parameters, operational state parameters, and electrical component parameters in the simulation parameters;

adjusting parameters of a renewable energy model based on the operational state parameters in the simulation parameters; and adjusting parameters of a transformer model based on transformer ratio parameters in the simulation parameters;

wherein controlling the physical terminals comprises:

controlling startup, shutdown, and speed adjustment of the physical terminals based on the information flow signal of the working state of the fault handling strategy; and controlling restart and line switching of the physical terminals based on the control instructions of the fault handling strategy;

wherein performing the data analysis operations on the handling results to obtain the analysis results comprises:

performing long-term historical data analysis operations on the handling results to obtain long-term historical data analysis results;

performing fault diagnosis operations on the handling results to obtain fault diagnosis results; and performing inference analysis operations on the handling results to obtain inference analysis results.

2. A testing apparatus, comprising:

a memory, a processor, and a testing program stored in the memory and executable on the processor, wherein the testing program is configured to implement the method for testing the system for enhancing the grid-supporting capability of the energy storage integrated with the renewable energy according to claim 1.

3. A non-transitory computer-readable storage medium, wherein the non-transitory computer-readable storage medium stores a testing program for enhancing the grid-supporting capability of the energy storage integrated with the renewable energy, wherein the testing program, when executed by a processor, implements the method for testing the system for enhancing the grid-supporting capability of the energy storage integrated with the renewable energy in according to claim 1.

* * * * *